United States Patent
Kraus

(10) Patent No.: US 11,247,426 B2
(45) Date of Patent: Feb. 15, 2022

(54) OSCILLATING SILAGE COMPACTOR

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 35 days.

(21) Appl. No.: 16/842,085

(22) Filed: Apr. 7, 2020

(65) Prior Publication Data

US 2021/0308976 A1 Oct. 7, 2021

(51) Int. Cl.
*B30B 9/30* (2006.01)
*A01D 85/00* (2006.01)

(52) U.S. Cl.
CPC ............ *B30B 9/3007* (2013.01); *B30B 9/306* (2013.01); *A01D 85/004* (2013.01)

(58) Field of Classification Search
CPC ....... B30B 9/3007; B30B 9/306; B30B 9/325; B30B 3/04; B30B 3/00; B30B 3/005; A01D 85/004; A01D 82/02; E01C 19/282; E01C 19/283; E01C 19/281; E01C 19/286; E01C 19/28; E01C 19/23; E02D 3/026; A01G 20/35; A01B 29/00; A01B 29/04; A01B 29/06
USPC ................................ 100/43, 67, 68; 404/117
See application file for complete search history.

(56) References Cited

U.S. PATENT DOCUMENTS

| | | | |
|---|---|---|---|
| 1,418,780 A | 6/1922 | Dewend | |
| 1,776,851 A | 9/1930 | Dunham | |
| 3,415,174 A | 12/1968 | Kaltenegger | |
| 3,435,741 A * | 4/1969 | Mozdzanowski | E01C 19/282 404/117 |
| 3,595,145 A * | 7/1971 | Mozdzanowski | E01C 19/282 404/117 |
| 3,722,380 A * | 3/1973 | Kaltenegger | E01C 19/283 404/117 |
| 3,871,788 A * | 3/1975 | Barsby | E01C 19/283 404/117 |
| 4,860,528 A * | 8/1989 | Seymour | A01D 82/02 56/16.4 R |

(Continued)

FOREIGN PATENT DOCUMENTS

| | | |
|---|---|---|
| DE | 202013006860 U1 | 8/2013 |
| DE | 102016009433 A1 | 2/2018 |
| PL | 66541 Y1 | 5/2013 |

OTHER PUBLICATIONS

Extended European Search Report and Written Opinion issued in European Patent Application No. 21159399.1, dated Aug. 16, 2021, in 08 pages.

*Primary Examiner* — Teresa M Ekiert
*Assistant Examiner* — Teresa A Guthrie

(57) ABSTRACT

A compactor includes a frame supporting a first roller assembly and a second roller assembly. At least one of the first roller assembly and the second roller assembly is moveable relative to the frame in a motion that includes an upward vertical component and a downward vertical component. An actuator is coupled to at least one of the first and second roller assemblies and is operable to repeatedly move at least one of the roller assemblies relative to the frame in both the upward vertical component and the downward vertical component to oscillate the roller assemblies relative to each other.

15 Claims, 4 Drawing Sheets

(56) References Cited

U.S. PATENT DOCUMENTS

| | | | | |
|---|---|---|---|---|
| 5,979,808 A | * | 11/1999 | Vogelgesang | A01D 82/02 241/236 |
| 2016/0168806 A1 | | 6/2016 | Corcoran et al. | |
| 2018/0325031 A1 | * | 11/2018 | Rotole | A01D 43/102 |

* cited by examiner

OSCILLATING SILAGE COMPACTOR

TECHNICAL FIELD

The disclosure generally relates to a compactor for compacting a compressible silage or silage material accumulated in a pile.

BACKGROUND

Forages, such as but not limited to, grasses, legumes, maize, crop residues, etc., are commonly harvested and fed to ruminant animals. One common practice for storing these silage materials is to harvest the forage and place the forage in an oxygen limiting structure, such as a bunker silo, a tightly wrapped bale, or a tower silo. The accumulated silage material is compressed or compacted to expel air entrapped in the accumulated pile of silage material. The silage material ferments within the oxygen limiting structure in an anaerobic environment, thereby preserving the silage material. The forage may then be removed and fed to the animals on an as-needed basis. This forage preservation process is often referred to as ensilage, and the silage material is often referred to as silage.

Compaction of the accumulated pile of silage material to expel the entrapped air is often performed by maneuvering or driving an agricultural vehicle, e.g., a tractor, over the pile of silage material. The rate of compaction is related and/or proportional to a pressure applied to the pile of silage material by the agricultural vehicle. In order to increase the applied pressure, ballast may be added to the agricultural vehicle. Additionally, additional compaction units, e.g., a weighted roller, may be attached to the agricultural vehicle to increase the compaction.

Existing soil compaction equipment, typically used to compact soil and gravel, have provided negligible and/or unsatisfactory improvements to the compaction of the pile of silage materials. For example, traditional "sheep's foot" rollers used to compact soil disrupt the surface of the pile of silage material as it rolls over the pile, thereby introducing or entraining air into the pile instead of expelling entrapped air. Traditional vibratory rollers also provide negligible improvement to the compaction of the silage materials because the vibration is absorbed by the silage material without settling or compacting. A desire to increase the speed and efficiency of compacting the silage material exists in order to reduce the time to form the pile of accumulated silage material and to limit or reduce the time the cut silage material is exposed to air.

SUMMARY

A silage compactor for compacting a compressible forage or silage material accumulated in a pile is provided. The silage compactor includes a frame. A first roller assembly is supported by the frame and is rotatable about a first axis. A second roller assembly is supported by the frame and is rotatable about a second axis. An actuator is coupled to one of the frame, the first roller assembly, and the second roller assembly. The actuator is operable to move one of the first roller assembly and the second roller assembly relative to the other of the first roller assembly and the second roller assembly in both an upward vertical component and a downward vertical component.

In one aspect of the disclosure, at least one of the first roller assembly and the second roller assembly is a moveable roller assembly. The moveable roller assembly is moveable relative to the frame. The moveable roller moves in a path that includes both the upward vertical component and the downward vertical component relative to a vertical axis. The actuator is coupled to the moveable roller assembly and is operable to repeatedly move the moveable roller assembly relative to the frame in both the upward vertical component and the downward vertical component along the vertical axis.

In another aspect of the disclosure, the actuator interconnects the frame and another structure, such as but not limited to a tongue or tow bar. The actuator is operable to move the frame, which in turn moves at least one of the first roller assembly and the second roller assembly relative to the other of the first roller assembly and the second roller assembly.

In one aspect of the disclosure, the actuator moves the moveable roller assembly so that the first roller assembly and the second roller assembly oscillate relative to each other along the vertical axis. By vertically oscillating the first roller assembly and the second roller assembly, a combined weight of the silage compactor, including both the first roller assembly and the second roller assembly, is cyclically transferred between the first roller assembly and the second roller assembly, thereby focusing the combined weight across only one of the first roller assembly and the second roller assembly, which increases the downward force applied when compared to distributing the combined weight simultaneously across both the first roller assembly and the second roller assembly.

In one aspect of the disclosure, the first roller assembly includes a plurality of first annular crests that extend circumferentially about the first axis. The first annular crests are spaced from each other along the first axis to define a plurality of first annular grooves therebetween, with a respective one of the first annular grooves disposed between each adjacent pair of the first annular crests. The second roller assembly includes a plurality of second annular crests that extend circumferentially about the second axis. The second annular crests are spaced from each other along the second axis to define a plurality of second annular grooves therebetween, with a respective one of the second annular grooves disposed between each adjacent pair of the second annular crests.

In one aspect of the disclosure, the first annular crests and the second annular crests are misaligned, axially offset and/or staggered relative to each other. As such, each of the first annular crests is aligned with one of the second annular grooves along the first axis. Similarly, each of the second annular crests is aligned with one of the first annular grooves along the second axis. Because the first annular crests and the second annular crests are staggered relative to each other, a larger portion of the surface area of the pile of silage material is engaged by the silage compactor, thereby improving compaction.

In one aspect of the disclosure, an outer circumference of each of the first annular crests and an outer circumference of each of the second annular crests overlap each other in a fore-aft direction of the frame to provide a meshing engagement therebetween. The fore-aft direction of the frame is coincident with and/or generally parallel with a direction of travel of the silage compactor. As such, each respective one of the first annular crests is at least partially disposed in a respective one of the second angular grooves. Similarly, each respective one of the second annular crests is at least partially disposed in a respective one of the first annular grooves.

In one aspect of the disclosure, each of the first annular crests and each of the second annular crests are axially spaced from each other along a transverse axis. The transverse axis is generally perpendicular to the fore-aft direction of travel and a longitudinal axis of the frame. In one implementation, each of the first annular crests are spaced a first distance from each adjacent first annular crest along the first axis. Similarly, each of the second annular crests are spaced a second distance from each adjacent second annular crest along the second axis. In one implementation, the first distance may be equal to the second distance.

In one aspect of the disclosure, a walking beam is mounted to the frame. The walking beam is rotatable relative to the frame about the transverse axis. The walking beam rotatably supports the first roller assembly and the second roller assembly. In one implementation the frame includes a pair of walking beams disposed on opposing sides of the frame, and cooperating to support the first roller assembly and the second roller assembly therebetween. One of the first roller assembly and the second roller assembly is attached to and supported by the walking beam at a first location, which is located forward of the transverse axis in the fore-aft direction of the frame. Another of the first roller assembly and the second roller assembly is attached to and supported by the walking beam at a second location, which is located rearward of the transverse axis in the fore-aft direction.

In one aspect of the disclosure, the actuator interconnects the walking beam and the frame. The actuator is operable to rotate the walking beam about the transverse axis to cause the oscillation of the first roller assembly and the second roller assembly. In one implementation, the actuator includes a linear actuator that is connected to the walking beam at a location spaced from the transverse axis. The linear actuator is extendable and retractable to rotate the walking beam about the transverse axis. As the walking beam rotates in a first rotational direction, one of the first roller assembly and the second roller assembly moves in a motion or along a path that includes an upward vertical component while the other of the first roller assembly and the second roller assembly moves along a path that includes a downward vertical component. When the rotation of the walking beam is reversed, such that the walking beam rotates in an opposite second rotational direction, the relative vertical movements of the first roller assembly and the second roller assembly are reversed.

In one aspect of the disclosure, the silage compactor includes a controller. The controller has a processor and a memory having a roller control algorithm stored thereon. The processor is operable to execute the roller control algorithm to determine a desired roller oscillation frequency based on a ground speed of the frame. The controller may then control the actuator to achieve the desired roller oscillation speed.

In one aspect of the disclosure, the frame may include a coupler operable to connect to a vehicle. The vehicle may include, but is not limited to, an agricultural vehicle such as a tractor. For example, the frame may include a 3-point hitch system configured for attachment to the tractor. However, it should be appreciated that the vehicle may be configured differently than an agricultural tractor. For example, the silage compactor may be configured as a self-propelled compactor, in which the frame is fixedly attached to a dedicated vehicle platform.

In one aspect of the disclosure, the first axis and the second axis are parallel to each other and perpendicular to longitudinal axis of the frame. The longitudinal axis of the frame extends in a fore-aft direction of the frame.

The above features and advantages and other features and advantages of the present teachings are readily apparent from the following detailed description of the best modes for carrying out the teachings when taken in connection with the accompanying drawings.

DETAILED DESCRIPTION

Figure 1:
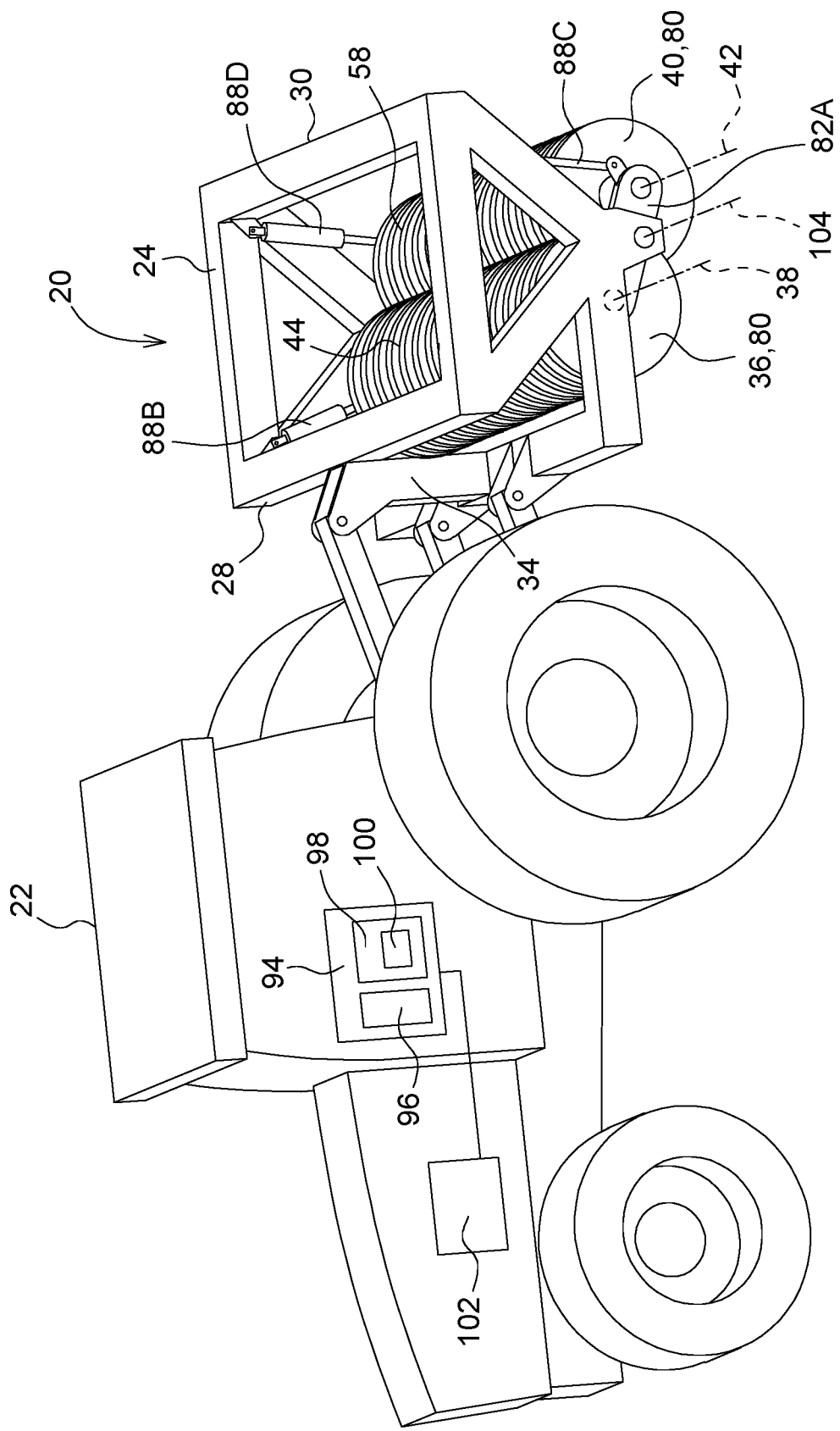
FIG. 1 is a schematic perspective view of an agricultural vehicle and a silage compactor.
Figure 2:
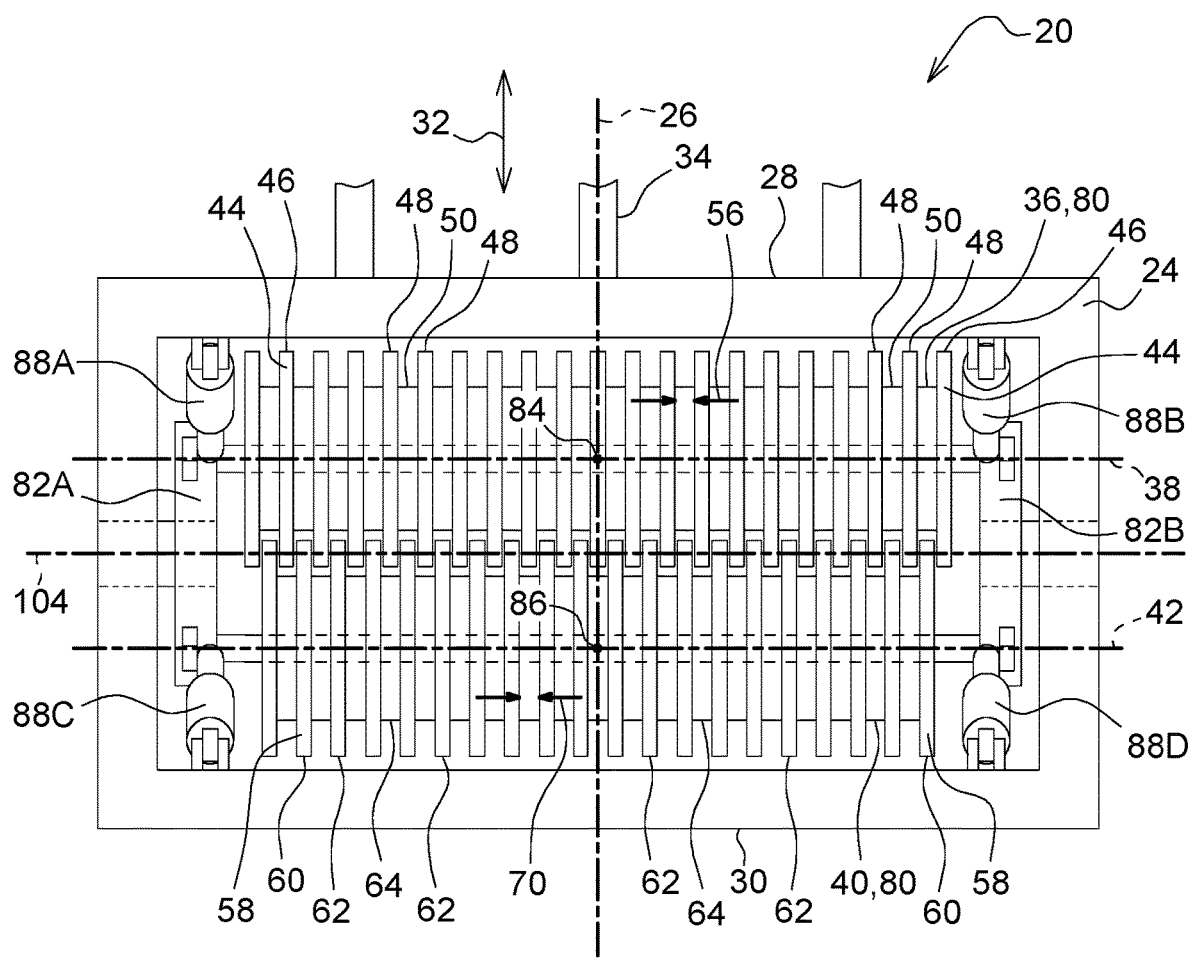
FIG. 2 is a schematic plan view of the silage compactor.
Figure 3:
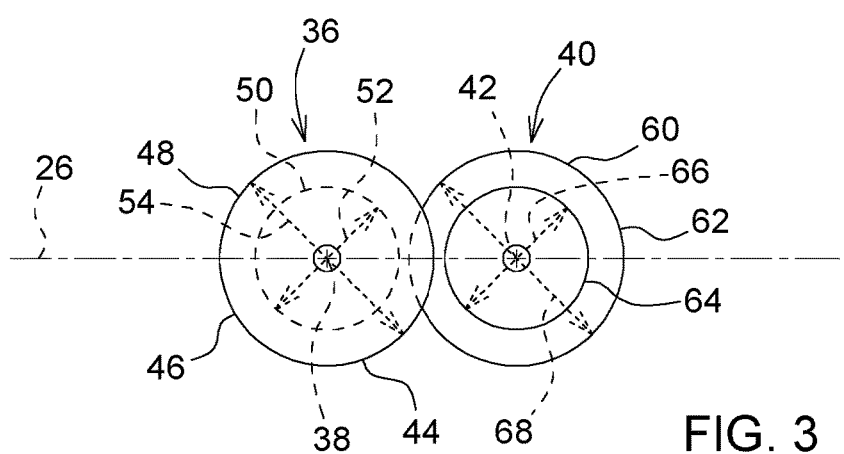
FIG. 3 is a schematic cross sectional view of the silage compactor, perpendicular to a transverse axis thereof.
Figure 4:
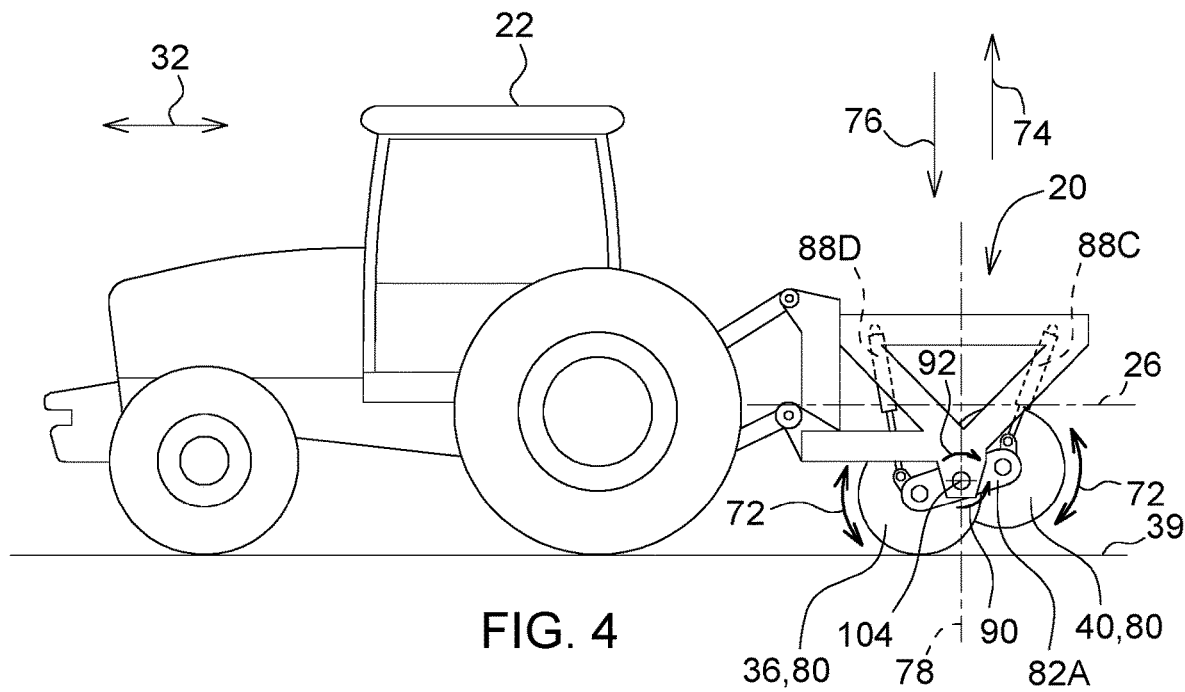
FIG. 4 is a schematic elevation view of the silage compactor showing a first roller assembly of the silage compactor raised and a second roller assembly of the silage compactor lowered.
Figure 5:
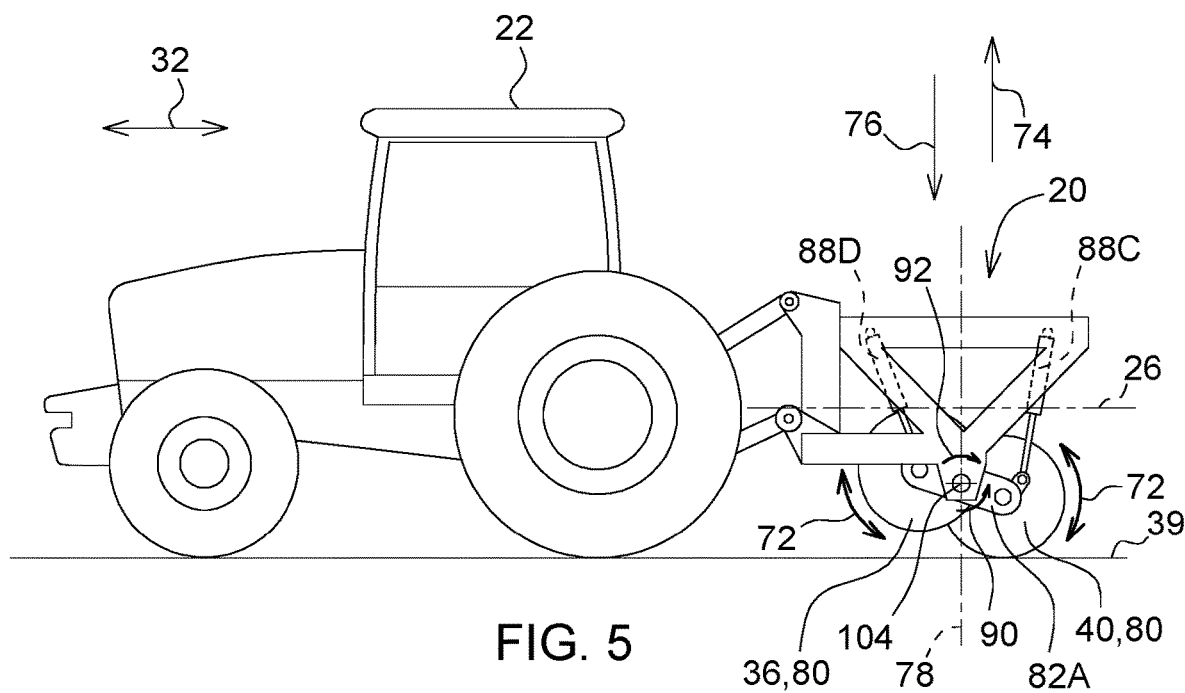
FIG. 5 is a schematic elevation view of the silage compactor showing the first roller assembly of the silage compactor lowered and the second roller assembly of the silage compactor raised.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a compactor is generally shown at 20. The compactor 20 is operable to compact a compressible material accumulated in a pile. For example, the compactor 20 may be configured as a silage compactor 20 operable to compact a pile of forage and/or silage material. The silage material may include, but is not limited to, grasses, legumes, maize, crop residues, etc. The compactor 20 may be maneuvered over the pile of the silage material to compact the pile, thereby expressing and/or removing at least a portion of air entrained in the pile of the silage material, after which the compacted pile of the silage material may be covered to ferment.

The compactor 20 may be configured for attachment to an agricultural vehicle 22, such as a tractor or other similar vehicle 22 shown in the Figures. The compactor 20 may be coupled to the tractor, with the tractor providing power for the compactor 20 and moving the compactor 20 over the pile of the silage material. However, it should be appreciated that the compactor 20 may alternatively be configured as a self-propelled implement, including its own power source operable to provide motive power, a steering system, a drive system, a hydraulic system, etc.

The compactor 20 includes a frame 24. The frame 24 forms a rigid structure that supports the various components of the compactor 20. The frame 24 defines a longitudinal axis 26 that extends between a forward end 28 and a rearward end 30 of the frame 24. The longitudinal axis 26 is generally parallel with a fore-aft direction of travel 32 of the compactor 20. In one implementation, the frame 24 may be constructed from metal structural members. The metal structural members may include steel, aluminum, iron, etc. Alternatively, the frame 24 may be constructed from some other rigid material, such as but not limited to carbon fiber, a composite material, a polymer material, or some other material not specifically mentioned or described herein. The structural members may include, but are not limited to tubular members, angle members, channel members, plate members, etc. The frame 24 may be formed to have a shape capable of supporting the components of the compactor 20, and should not be limited to the example shape and/or construction shown in the Figures.

The frame 24 may include a coupler 34. The coupler 34 is operable to connect the frame 24 to the vehicle 22. For example, in one implementation, the vehicle 22 may include an agricultural tractor having a three-point hitch system. The three-point hitch system may be located at a rear of the vehicle 22, or at a front of the vehicle 22. As is understood in the art, the three-point hitch system includes three links that are attached to both the vehicle 22 and the coupler 34, thereby securing the compactor 20 to the vehicle 22. It should be appreciated that the coupler 34 may be configured differently than the example implementation described herein, and may include configurations other than the example three-point hitch system shown in the Figures.

The compactor 20 includes a first roller assembly 36. The first roller assembly 36 is supported by the frame 24 and is rotatable about a first axis 38. In the example implementation shown in the Figures and described herein, the first roller assembly 36 includes a generally cylindrical structure that is concentric with the first axis 38. The first axis 38 is generally perpendicular to the longitudinal axis 26 of the frame 24. The first roller assembly 36 may be positioned relative to a ground surface 39 and configured to exhibit a significant weight suitable for compressing the pile of silage material against the ground surface 39. For example, the first roller assembly 36 may be constructed from a heavy and/or dense material, such as but not limited to steel. In other implementations, the first roller assembly 36 may be constructed from a light weight material, such as a plastic or polymer, and then filled with a heavy and/or dense material, such as but not limited to a liquid, e.g., water.

The compactor 20 includes a second roller assembly 40. The second roller assembly 40 is supported by the frame 24 and is rotatable about a second axis 42. In the example implementation shown in the Figures and described herein, the second roller assembly 40 includes a generally cylindrical structure that is concentric with the second axis 42. The second axis 42 is generally perpendicular to the longitudinal axis 26 of the frame 24. The first axis 38 and the second axis 42 are generally parallel to each other and generally perpendicular to longitudinal axis 26 of the frame 24. The second roller assembly 40 may be positioned relative to the ground surface 39 and configured to exhibit a significant weight suitable for compressing the pile of silage material against the ground surface 39. For example, the second roller assembly 40 may be constructed from a heavy and/or dense material, such as but not limited to steel. In other implementations, the second roller assembly 40 may be constructed from a light weight material, such as a plastic or polymer, and then filled with a heavy and/or dense material, such as but not limited to a liquid, e.g., water.

The first roller assembly 36 includes a plurality of first discs 44 that are arranged parallel to and spaced from each other along the first axis 38. Each of the first discs 44 has an outer circumference 46 that defines a first annular crest 48 extending circumferentially about the first axis 38. As such, the first roller assembly 36 includes a plurality of the first annular crests 48. Each adjacent pair of the first discs 44 defines a respective first annular groove 50 therebetween extending circumferentially about the first axis 38. As such, the first roller assembly 36 includes a plurality of first annular grooves 50. A respective one of the first annular grooves 50 is disposed between a respective pair of adjacent first annular crests 48. The first annular grooves 50 include a diameter 52 relative to the first axis 38 that is smaller than a diameter 54 of the first annular crests 48 relative to the first axis 38. Accordingly, it should be appreciated that the outer circumference 46 of the first annular discs is larger than an exterior circumference of the first annular grooves 50. In the example implementation shown in the Figures and described herein, each of the first annular crests 48 is equidistantly spaced from an adjacent one of the first annular crests 48 a first distance 56. In other words, the first annular crests 48 are equidistantly spaced from each other along and relative to the first axis 38. However, it should be appreciated that in other embodiments, at least one of the first discs 44 may be spaced from the remaining other of the first discs 44 by a distance other than the first distance 56, i.e., not equally spaced.

The second roller assembly 40 includes a plurality of second discs 58 that are arranged parallel to and spaced from each other along the second axis 42. Each of the second discs 58 has an outer circumference 60 that defines a second annular crest 62 extending circumferentially about the second axis 42. As such, the second roller assembly 40 includes a plurality of the second annular crests 62. Each adjacent pair of the second discs 58 defines a respective second annular groove 64 therebetween extending circumferentially about the second axis 42. As such, the second roller assembly 40 includes a plurality of second annular grooves 64. A respective one of the second annular grooves 64 is disposed between a respective pair of adjacent second annular crests 62. The second annular grooves 64 include a diameter 66 relative to the second axis 42 that is smaller than a diameter 68 of the second annular crests 62 relative to the second axis 42. Accordingly, it should be appreciated that the outer circumference 60 of the second annular discs is larger than an exterior circumference of the second annular grooves 64. In the example implementation shown in the Figures and described herein, each of the second annular crests 62 is equidistantly spaced from an adjacent one of the second annular crests 62 a second distance 70. In other words, the second annular crests 62 are equidistantly spaced from each other along and relative to the second axis 42. However, it should be appreciated that in other embodiments, at least one of the second discs 58 may be spaced from the remaining other of the second discs 58 by a distance other than the second distance 70, i.e., not equally spaced.

In the implementation shown in the Figures and described herein, the first annular crests 48 and the second annular crests 62 are axially spaced from each other, i.e., staggered, along or relative to a transverse axis 104. However, in other implementations, it should be appreciated that the first annular crests 48 and the second annular crests 62 may be aligned with each other along and relative to the transverse axis 104.

In the implementation shown in the Figures and described herein, each respective one of the first annular crests 48 is aligned with a respective one of the second annular grooves 64 along the first axis 38. Similarly, each respective one of the second annular crests 62 is aligned with a respective one of the first annular grooves 50 along the second axis 42.

In the implementation shown in the Figures and described herein, the outer circumference 46 of at least one of the first discs 44 and the first annular crest 48 thereof, and the outer circumference 60 of at least one of the second discs 58, and the second annular crest 62 thereof, overlap each other along and relative to the longitudinal axis 26 of the frame 24. As such, at least one of the first annular crests 48 at least partially extends into a respective one of the second annular grooves 64, and at least one of the second annular crests 62 at least partially extends into a respective one of the first annular grooves 50. However, in other implementations, the outer circumference 46 of all of the first discs 44 and the first annular crests 48 thereof, and the outer circumference 60 of all of the second discs 58, and the second annular crests 62 thereof, may not overlap each other along and relative to the longitudinal axis 26 of the frame 24, and may be separated by a gap therebetween.

At least one of the first roller assembly 36 and the second droller assembly is moveable relative to the frame 24, and may be defined as a moveable roller assembly 80. The moveable roller assembly 80 is moveable relative to the frame 24 along a path 72 that includes an upward vertical component 74 and a downward vertical component 76 relative to a vertical axis 78. The vertical axis 78 is generally perpendicular to the longitudinal axis 26 of the frame 24 and extends generally parallel with gravity.

In the example implementation shown in the Figures and described herein, the compactor 20 includes the first roller assembly 36 moveable relative to the frame 24 in both the upward vertical component 74 and the downward vertical component 76. Similarly, the example implementation of the compactor 20 includes the second roller assembly 40 moveable relative to the frame 24 in both the upward vertical component 74 and the downward vertical component 76. As such, both of the first roller assembly 36 and the second roller assembly 40 are configured for vertical movement relative to the frame 24, and therefore may both be considered as a moveable roller assembly 80. However, in other implementations, it should be appreciated that only the first roller assembly 36 or only the second roller assembly 40 may be configured for vertical movement relative to the frame 24, and therefore in other implementations only the first roller assembly 36 or the second roller assembly 40 may be defined as a moveable roller assembly 80.

As shown in the Figures, the example implementation of the compactor 20 includes a walking beam 82A, 82B. The walking beam 82A, 82B is mounted to the frame 24 and is rotatable relative to the frame 24 about the transverse axis 104. The walking beam 82A, 82B rotatably supports the first roller assembly 36 and the second roller assembly 40. In the example implementation, the compactor 20 includes a first walking beam 82A rotatably attached to the frame 24 on a first lateral side of the frame 24 relative to the longitudinal axis 26, and a second walking beam 82B rotatably attached to the frame 24 on a second lateral side of the frame 24 relative to the longitudinal axis 26. The first walking beam 82A and the second walking beam 82B support the first roller assembly 36 and the second roller assembly 40 therebetween.

The walking beams 82A, 82B may be attached to the frame 24 in a suitable manner enabling rotation of the walking beams 82A, 82B relative to the frame 24 about the transverse axis 104. For example, each of the walking beams 82A, 82B may be attached to the frame 24 with a respective axle or pin mounted to the frame 24 and supporting the respective one of the walking beams 82A, 82B. A bearing or bushing may be mounted to the walking beams 82A, 82B for rotatably receiving the respective axle or pin therein. It should be appreciated that the walking beams 82A, 82B may be rotatably connected to the frame 24 in some other manner not shown or described herein.

The first roller assembly 36 is attached to and supported by the walking beam 82A, 82B at a first location 84 along the longitudinal axis 26. The first location 84 is located forward of the transverse axis 104 in the fore-aft direction of travel 32 of the frame 24. The second roller assembly 40 is attached to and supported by the walking beam 82A, 82B at a second location 86 along the longitudinal axis 26. The second location 86 is located rearward of the transverse axis 104 in the fore-aft direction of travel 32 of the frame 24.

The compactor 20 further includes an actuator 88A, 88B, 88C, 88D. The actuator 88A, 88B, 88C, 88D is coupled to and configured to move the moveable roller assembly 80. As described above, both the first roller assembly 36 and the second roller assembly 40 may be defined as a moveable roller assembly 80 in the example implementation shown in the Figures and described herein. As such, in the example implementation described herein, the actuator 88A, 88B, 88C, 88D is coupled to and configured to move both the first roller assembly 36 and the second roller assembly 40. However, in other implementations, in which only one of the first roller assembly 36 and the second roller assembly 40 may be defined as a moveable roller assembly 80, then the actuator 88A, 88B, 88C, 88D may only be coupled to and configured to move only the one moveable roller assembly 80.

In the example implementation described herein, the actuator 88A, 88B, 88C, 88D is configured to repeatedly move the first roller assembly 36 and the second roller assembly 40 relative to the frame 24 and along respective paths 72 that include movement in both the upward vertical component 74 and the downward vertical component 76 relative to the vertical axis 78. The actuator 88A, 88B, 88C, 88D may be configured to move the first roller assembly 36 and the second roller assembly 40 in opposite vertical directions such that the first roller assembly 36 and the second roller assembly 40 oscillate relative to each other relative to the vertical axis 78.

The actuator 88A, 88B, 88C, 88D interconnects the moveable roller assemblies 36, 40, e.g., the first roller assembly 36 and the second roller assembly 40 in the example implementation, and the frame 24. In the example implementation, the actuator 88A, 88B, 88C, 88D interconnects the frame 24 and the walking beams 82A, 82B, with the walking beams 82A, 82B in turn supporting the first roller assembly 36 and the second roller assembly 40. The actuator 88A, 88B, 88C, 88D is operable to rotate the walking beam 82A, 82B about the transverse axis 104.

In the example implementation shown in the Figures and described herein, the actuator 88A, 88B, 88C, 88D includes a first actuator 88A, a second actuator 88B, a third actuator 88C, and a fourth actuator 88D. Each of the actuators 88A, 88B, 88C, 88D include a linear actuator 88A, 88B, 88C, 88D connected to the walking beam 82A, 82B at a location spaced from and offset relative to the transverse axis 104. More specifically, the first actuator 88A is attached to the first walking beam 82A at a location forward of the transverse axis 104. The second actuator 88B is attached to the second walking beam 82B at a location forward of the transverse axis 104. The third actuator 88C is attached to the first walking beam 82A rearward of the transverse axis 104. The fourth actuator 88D is attached to the second walking beam 82B rearward of the transverse axis 104. Although the example implementation describes the actuators 88A, 88B, 88C, 88D as linear actuators 88A, 88B, 88C, 88D, it should be appreciated that the actuators 88A, 88B, 88C, 88D may be configured differently in other implementations. For example, in other implementations, the actuators 88A, 88B, 88C, 88D may alternatively be configured as rotary actuators 88A, 88B, 88C, 88D. It should be appreciated that other types and/or configurations of actuators 88A, 88B, 88C, 88D may be used to move the first roller assembly 36 and/or the second roller assembly 40. Furthermore, while the example implementation includes four actuators 88A, 88B, 88C, 88D, it should be appreciated that other implementations may configure the actuator 88A, 88B, 88C, 88D as a single device or component, or may include a number of actuators 88A, 88B, 88C, 88D different than the example four actuators 88A, 88B, 88C, 88D shown in the Figures and described herein.

The linear actuators 88A, 88B, 88C, 88D are extendable and retractable to rotate the walking beams 82A, 82B about the transverse axis 104. The linear actuators 88A, 88B, 88C, 88D may include, but are not limited to, hydraulic cylinders that extend and retract in response to fluid movement to and from the actuators 88A, 88B, 88C, 88D. In other implementations, the linear actuators 88A, 88B, 88C, 88D may include, pneumatic cylinders, electric motors, or some other device capable of extending and contracting in response to a control signal. It should be appreciated that the linear actuators 88A, 88B, 88C, 88D may be configured in many different manners.

Extension of the first actuator 88A and the second actuator 88B simultaneously with retraction of the third actuator 88C and the fourth actuator 88D rotates the walking beams 82A, 82B in a first rotational direction 90 about the transverse axis 104, which moves the first roller assembly 36 in the downward vertical direction and the second roller assembly 40 in the upward vertical direction. In contrast, retraction of the first actuator 88A and the second actuator 88B simultaneously with extension of the third actuator 88C and the fourth actuator 88D rotates the walking beams 82A, 82B in a second rotational direction 92 about the transverse axis 104. The second rotational direction 92 is opposite the first rotational direction 90. Rotation of the walking beams 82A, 82B in the second rotational direction 92 about the transverse axis 104 moves the first roller assembly 36 in the upward vertical direction and the second roller assembly 40 in the downward vertical direction.

The movement of the first roller assembly 36 and the second roller assembly 40 relative to the frame 24 may alternate or change a relative position between the first roller assembly 36 and the second roller assembly 40 between a respective lower position relative to the vertical axis 78 and a respective upper position relative to the vertical axis 78. In other words, the first roller assembly 36 and the second roller assembly 40 are moved to position one of the roller assemblies 36, 40 lower than the other relative to the vertical axis 78. By positioning one of the roller assemblies 36, 40 lower than the other, the cumulative weight of the compactor 20 may be spread over just one of the first roller assembly 36 and the second roller assembly 40. Additionally, by repeating this movement, the first roller assembly 36 and the second roller assembly 40 may oscillate relative to teach other, thereby kneading the silage material therebetween as the compactor 20 rolls over the silage material, thereby helping to compact and expel the entrained air from the pile of silage material.

It should be appreciated that the walking beam 82A, 82B construction and the actuators 88A, 88B, 88C, 88D attached to the walking beams 82A, 82B described herein and shown in the Figures provide one example implementation for moving the first roller assembly 36 and the second roller assembly 40 relative to the frame 24. However, it is contemplated that the first roller assembly 36 and the second roller assembly 40 may be attached to the frame 24 and moved relative to the frame 24 in a manner not shown or described herein.

The compactor 20 may further include a controller 94. The controller 94 may be positioned on the frame 24. Alternatively, such as shown in the figures of the example implementation, the controller 94 may be positioned in the attached vehicle 22. The controller 94 may alternatively be referred to as a computing device, a computer, a module, a control module, a control unit, etc. The controller 94 is operable to control the operation of the actuator 88A, 88B, 88C, 88D. The controller 94 may include a processor 96, a memory 98, and all software, hardware, algorithms, connections, sensors, etc., necessary to manage and control the operation of the actuator 88A, 88B, 88C, 88D. As such, a method may be embodied as a program or algorithm operable on the controller 94. It should be appreciated that the controller 94 may include any device capable of analyzing data from various sensors, comparing data, making the necessary decisions required to control the operation of the actuator 88A, 88B, 88C, 88D and executing the required tasks necessary to control the operation of the actuator 88A, 88B, 88C, 88D.

The controller 94 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 98 may include any non-transitory/tangible medium which participates in providing data or computer-readable instructions. The memory 98 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 94 includes the tangible, non-transitory memory 98 on which are recorded computer-executable instructions, including a roller control algorithm 100. The processor 96 of the controller 94 is configured for executing the roller algorithm. The roller control algorithm 100 implements a method of controlling the compactor 20.

The method of controlling the compactor 20 includes determining a desired roller oscillation frequency based on a ground speed of the frame 24. In order to determine the desired roller oscillation frequency, the controller 94 may sense a ground speed of the vehicle 22. The compactor 20 and/or the vehicle 22 may include a ground speed sensor 102 that provides a sensor signal indicative of the ground speed of the compactor 20. The controller 94 may use the sensor signal from the ground speed sensor 102 to determine the ground speed of the vehicle 22.

Once the ground speed of the compactor 20 is known, the controller 94 may determine a desired oscillation frequency. The desired oscillation frequency may include the number of position changes, i.e., changing the respective positions of the first roller assembly 36 and the second roller assembly 40 between the respective lower position and the respective upper position relative to the vertical axis 78, that the first roller assembly 36 and the second roller assembly 40 execute in a given period of time. The controller 94 may determine the desired oscillation frequency in a suitable manner. For example, the controller 94 may reference a table stored in the memory 98 that correlates or relates different ground speeds to different desired oscillation frequencies. As such, the controller 94 inputs the current ground speed of the compactor 20, and outputs a desired oscillation frequency, based on the correlation included in the table.

Once the controller 94 has determined the desired oscillation frequency, the controller 94 may then control the actuators 88A, 88B, 88C, 88D to achieve the desired roller oscillation speed. Controlling the actuators 88A, 88B, 88C, 88D to achieve the desired roller oscillation speed may include sending an electronic signal to one or more valves controlling fluid flow to the actuators 88A, 88B, 88C, 88D, thereby controlling fluid flow to and from the actuators 88A, 88B, 88C, 88D. It should be appreciated that the manner in which the controller 94 controls the actuators 88A, 88B, 88C, 88D is dependent upon the specific type, configuration, operation, etc., of the actuator 88A, 88B, 88C, 88D. As such, the manner in which the controller 94 controls the actuator 88A, 88B, 88C, 88D may vary from the example implementation described herein.

Figure 6:
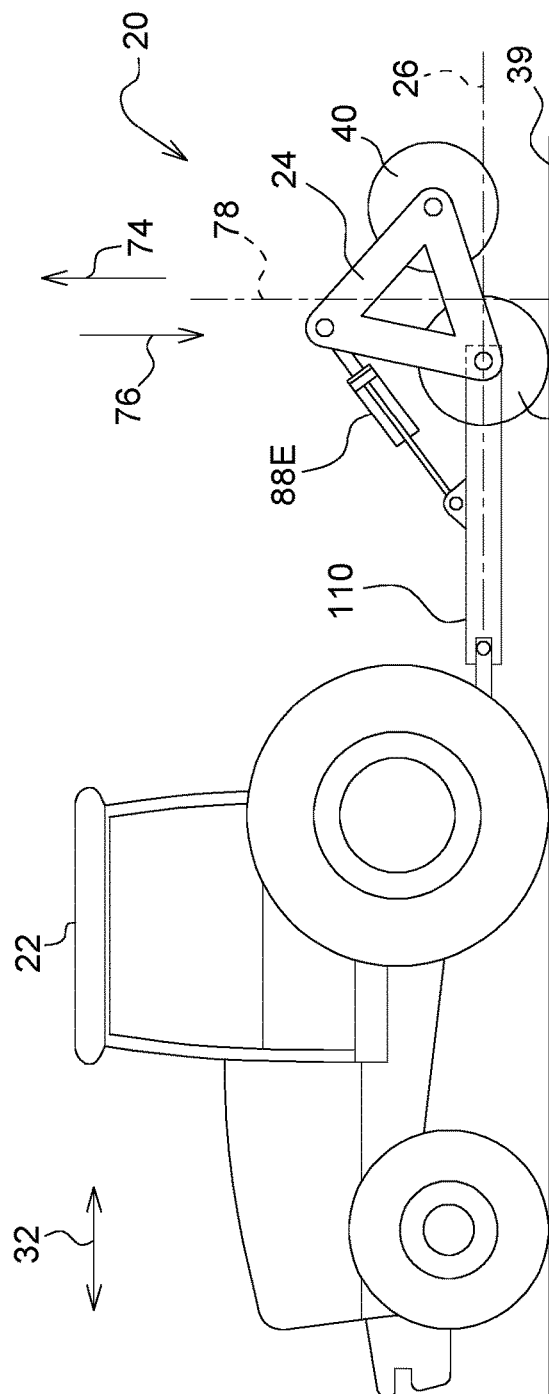
FIG. 6 is a schematic side elevation view of an alternative embodiment of the compactor, showing the first roller assembly raised relative to the second roller assembly, and the second roller assembly lowered relative to the first roller assembly.
Figure 7:
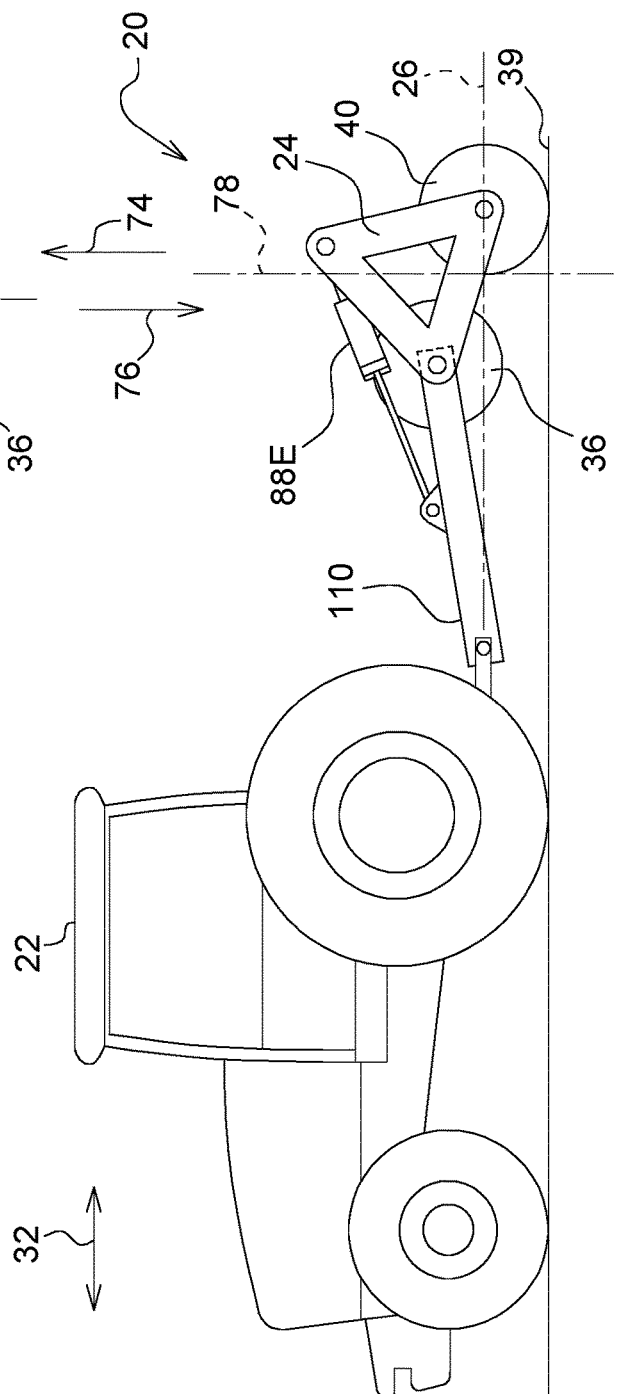
FIG. 7 is a schematic side elevation view of the alternative embodiment of the compactor, showing the first roller assembly lowered relative to the second roller assembly, and the second roller assembly raised relative to the first roller assembly.

Referring to FIGS. 6 and 7, an alternative embodiment of the compactor 20 is shown. The alternative embodiment of the compactor 20 includes both the first roller assembly 36 and the second roller assembly 40 coupled to the frame 24, such that both the first roller assembly 36 and the second roller assembly 40 do not move relative to the frame 24. Instead, the frame 24 is rotated to cause one of the first roller assembly 36 and the second roller assembly 40 to move relative to the other of the first roller assembly 36 and the second roller assembly 40. Specifically, an actuator 88E interconnects the frame 24 and another component of the compactor, such as a tongue or tow bar 110. Actuation of the actuator 88E causes the frame 24 to rotate relative to the tow bar 110, which in turn causes the second roller assembly 40 to move vertically relative to the first roller assembly 36.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A compactor for compacting a pile of compressible material against a ground surface, the compactor comprising:
   a frame;
   a first roller assembly supported by the frame and rotatable about a first axis, wherein the first roller assembly is positioned to compress the pile of compressible material against the ground surface;
   a second roller assembly supported by the frame and rotatable about a second axis, wherein the second roller assembly is positioned to compress the pile of compressible material against the ground surface;
   a linear actuator coupled to one of the frame, the first roller assembly, and the second roller assembly, wherein the linear actuator is operable to move one of the first roller assembly and the second roller assembly relative to the other of the first roller assembly and the second roller assembly in both an upward vertical component and a downward vertical component to define an oscillating movement between the first roller assembly and the second roller assembly;
   a walking beam mounted to the frame and rotatable relative to the frame about a transverse axis;
   wherein the first roller assembly is attached to and rotatably supported by the walking beam at a first location located forward of the transverse axis in a fore-aft direction of the frame, and the second roller assembly is attached to and rotatably supported by the walking beam at a second location located rearward of the transverse axis in the fore-aft direction; and
   wherein the linear actuator includes a hydraulic cylinder interconnecting the frame and the walking beam, and connected to the walking beam at a location spaced from the transverse axis, wherein the hydraulic cylinder is extendable and retractable to rotate the walking beam about the transverse axis.

2. The compactor set forth in claim 1, wherein at least one of the first roller assembly and the second roller assembly is a moveable roller assembly that is moveable relative to the frame in both the upward vertical component and the downward vertical component.

3. The compactor set forth in claim 2, wherein the linear actuator couples the moveable roller assembly and the frame, and wherein the linear actuator is operable to move the moveable roller assembly relative to the frame in both the upward vertical component and the downward vertical component.

4. The compactor set forth in claim 3, wherein the first roller assembly includes a plurality of first annular crests extending circumferentially about the first axis and spaced from each other along the first axis to define a plurality of first annular grooves, with each adjacent pair of the plurality of first annular crests defining a respective one of the plurality of first annular grooves therebetween.

5. The compactor set forth in claim 4, wherein the second roller assembly includes a plurality of second annular crests extending circumferentially about the second axis and spaced from each other along the second axis to define a plurality of second annular grooves, with each adjacent pair of the plurality of second annular crests defining a respective one of the plurality of second annular grooves therebetween.

6. The compactor set forth in claim 5, wherein each of the plurality of first annular crests is aligned with one of the plurality of second annular grooves along the first axis, and wherein each of the plurality of second annular crests is aligned with one of the plurality of first annular grooves along the second axis.

7. The compactor set forth in claim 5, wherein an outer circumference of at least one of the plurality of first annular crests and an outer circumference of at least one of the plurality of second annular crests overlap each other in the fore-aft direction of the frame.

8. The compactor set forth in claim 5, wherein each of the plurality of first annular crests and each of the plurality of second annular crests are axially spaced from each other along the transverse axis.

9. The compactor set forth in claim 1, further comprising a controller having a processor and a memory having a roller control algorithm stored thereon, wherein the processor is operable to execute the roller control algorithm to:
determine a desired roller oscillation frequency based on a ground speed of the frame; and
control the linear actuator to achieve the desired roller oscillation frequency.

10. The compactor set forth in claim 1, wherein the frame includes a coupler operable to connect to a vehicle.

11. The compactor set forth in claim 1, wherein the first axis and the second axis are parallel to each other and perpendicular to a longitudinal axis of the frame.

12. A silage compactor for compacting a pile of crop silage against a ground surface, the silage compactor comprising:
a frame;
a first roller assembly supported by the frame and rotatable about a first axis, wherein the first roller assembly is moveable relative to the frame in both an upward vertical component and a downward vertical component, and wherein the first roller assembly is positioned to compress the pile of compressible material against the ground surface;
a second roller assembly supported by the frame and rotatable about a second axis, wherein the second roller assembly is moveable relative to the frame in both the upward vertical component and the downward vertical component, and wherein the second roller assembly is positioned to compress the pile of compressible material against the ground surface;
an actuator coupled to the first roller assembly and the second roller assembly and operable to repeatedly move the first roller assembly and the second roller assembly relative to each other in both the upward vertical component and the downward vertical component such that the first roller assembly and the second roller assembly oscillate relative to each other to alternate a relative position between the first roller assembly and the second roller assembly between a respective lower position relative to a vertical axis and a respective upper position relative to the vertical axis;
and a walking beam mounted to the frame and rotatable relative to the frame about a transverse axis;
wherein the actuator includes a hydraulic cylinder interconnecting the frame and the walking beam and connected to the walking beam at a location spaced from the transverse axis, wherein the hydraulic cylinder is extendable and retractable to rotate the walking beam about the transverse axis to oscillate the first roller assembly and the second roller assembly;
wherein the first roller assembly includes a plurality of first discs arranged parallel to each other along the first axis, with each of the plurality of first discs having an outer circumference defining a first annular crest extending circumferentially about the first axis, with each adjacent pair of the plurality of first discs defining a respective first annular groove therebetween;
wherein the second roller assembly includes a plurality of second discs arranged parallel to each other along the second axis, with each of the plurality of second discs having an outer circumference defining a second annular crest extending circumferentially about the second axis, with each adjacent pair of the plurality of second discs defining a respective second annular groove therebetween; and
wherein each of the plurality of first annular crests is aligned with a respective one of the second annular grooves along the first axis, and wherein each of the plurality of second annular crests is aligned with a respective one of the first annular grooves along the second axis.

13. The silage compactor set forth in claim 12, wherein the outer circumference of at least one of the plurality of first discs and the outer circumference of at least one of the plurality of second discs overlap each other in a fore-aft direction of the frame.

14. The silage compactor set forth in claim 13, wherein each of the plurality of first annular crests at least partially extends into a respective one of the second annular grooves, and wherein each of the plurality of second annular crests at least partially extends into a respective one of the first annular grooves.

15. The silage compactor set forth in claim 12, wherein the first roller assembly is attached to and supported by the walking beam at a first location located forward of the transverse axis in a fore-aft direction of the frame, and the second roller assembly is attached to and supported by the walking beam at a second location located rearward of the transverse axis in the fore-aft direction.

* * * * *